(12) United States Patent
Yamanaka (10) Patent No.: US 6,845,687 B2
(45) Date of Patent: Jan. 25, 2005

(54) BICYCLE CRANK ARM

(75) Inventor: Masahiro Yamanaka, Izumisano (JP)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 10/750,923

(22) Filed: Dec. 31, 2003

(65) Prior Publication Data

US 2004/0154431 A1 Aug. 12, 2004

Related U.S. Application Data (60) Division of application No. 10/095,262, filed on Mar. 8, 2002, now Pat. No. 6,755,095, which is a continuation-in-part of application No. 10/002,256, filed on Nov. 23, 2001.

(51) Int. Cl.[7] .................................................. G05G 1/14
(52) U.S. Cl. ..................... 74/594.1; 74/594.2; D12/123; 403/319; 403/359
(58) Field of Search ............................. 74/594.1, 594.2; D12/123; 403/319, 359

(56) References Cited

U.S. PATENT DOCUMENTS

| | | |
|---|---|---|
| 622,644 A | 4/1899 | Annable |
| 626,227 A | 6/1899 | Gaylor |
| 648,077 A | 4/1900 | Ludlow |
| 1,389,997 A | 9/1921 | Sedgwick |
| 4,331,043 A | 5/1982 | Shimano |
| 4,522,610 A | 6/1985 | Nagano |
| 4,704,919 A * | 11/1987 | Durham ...................... 74/594.1 |
| 4,728,218 A * | 3/1988 | Durham ...................... 403/319 |
| 5,010,785 A * | 4/1991 | Romero ...................... 74/594.1 |
| D323,308 S * | 1/1992 | Romero ...................... D12/123 |
| 5,791,203 A | 8/1998 | Chen et al. |
| 5,819,599 A | 10/1998 | Yamanaka |
| 5,980,116 A | 11/1999 | Chiang |
| 6,199,449 B1 | 3/2001 | Harrington |

FOREIGN PATENT DOCUMENTS

| | | | |
|---|---|---|---|
| EP | 485954 A1 | 5/1992 | |
| EP | 512149 A1 | 11/1992 | |
| EP | 000513647 A1 * | 11/1992 | ................ 74/594.1 |
| JP | 5-250056 | 9/1993 | |

* cited by examiner

Primary Examiner—Vinh T. Luong
(74) Attorney, Agent, or Firm—James A. Deland (57) ABSTRACT

A bicycle crank arm apparatus includes an axle having a first end portion and a second end portion, wherein the first end portion has an outer peripheral surface and a threaded inner peripheral surface; an axle bolt having a threaded outer peripheral surface screwed into the threaded inner peripheral surface of the first end portion of the axle; a crank arm having an axle mounting boss defining an opening for receiving the first end portion of the axle therein, wherein the axle mounting boss includes a first fastener for tightening the crank arm mounting boss around the first end portion of the axle; and wherein the crank arm boss is positioned axially inwardly of the axle bolt.

5 Claims, 9 Drawing Sheets

BICYCLE CRANK ARM

CROSS REFERENCE TO RELATED APPLICATIONS

This application is a division of application Ser. No. 10/095,262, filed Mar. 8, 2002, now U.S. Pat. No. 6,755,095.

This application is a continuation-in-part of copending U.S. patent application Ser. No. 10/002,256 filed Nov. 23, 2001 titled "Seal Assembly for a Bicycle Bottom Bracket."

BACKGROUND OF THE INVENTION

The present invention is directed to bicycles and, more particularly, to a bicycle crank assembly and to the components and tools used to assemble the bicycle crank assembly.

A bicycle bottom bracket is a cylindrical tube portion of the bicycle frame used to rotatably mount the pedal assembly to the bicycle. The pedal assembly usually comprises right and left crank arms, each of which has a pedal attached to one end. The other end of each crank arm is attached to an axle that extends through the bottom bracket. A bearing assembly is disposed between the axle and the bottom bracket at each side of the bottom bracket for rotatably supporting the axle, and one or more front sprockets usually are attached to the right side crank arm for driving the bicycle chain.

The front sprocket(s) must be properly aligned with the rear sprocket(s) attached to the rear wheel so that the bicycle operates properly. Thus, the axle must be properly positioned laterally within the bottom bracket. In one known technique for adjusting the lateral position of the axle, the axle is rotatably centered and laterally fixed within a tubular member by bearing assemblies installed at opposite ends of the tubular member. The axle and tubular member then are placed inside the bottom bracket. Adapter members having threaded outer peripheral surfaces are screwed into the threaded inner peripheral surface of the bottom bracket on opposite sides of the tubular member so that the lateral position of the axle is determined by how much of each adapter member is screwed into the bottom bracket. Unfortunately, since the adapter members must be long enough to accommodate many different lateral positions of the axle, usually a portion of the threaded outer peripheral surface of each adapter member is exposed, and this often results in rusting and dirt contamination of the threads. Also, since the axle is fixed to the tubular member through the bearing assemblies, the axle, tubular member and bearing assemblies ordinarily must be replaced as a unit.

SUMMARY OF THE INVENTION

The present invention is directed to a bicycle crank assembly wherein the lateral position of the axle may be adjusted without one or more of the disadvantages of prior art axle assemblies. In one embodiment of the present invention, a bicycle crank arm apparatus includes an axle having a first end portion and a second end portion, wherein the first end portion has an outer peripheral surface and a threaded inner peripheral surface; an axle bolt having a threaded outer peripheral surface screwed into the threaded inner peripheral surface of the first end portion of the axle; a crank arm having an axle mounting boss defining an opening for receiving the first end portion of the axle therein, wherein the axle mounting boss includes a first fastener for tightening the crank arm mounting boss around the first end portion of the axle; and wherein the crank arm boss is positioned axially inwardly of the axle bolt. At least one advantage of this structure is that the axle bolt may be used to laterally position the axle and the crank arms relative to each other, and the crank arm may be used to cover any threaded portion of the axle bolt that is not screwed into the axle.

In one embodiment of an axle bolt used to assembly the crank arm to the axle, an axle bolt includes a bolt body having a threaded outer peripheral surface and an inner peripheral surface defining an opening. A plurality of splines are circumferentially disposed on the inner peripheral surface of the bolt body, and a flange extends radially outwardly from the bolt body.

In one embodiment of a tool for screwing the axle bolt into the axle, the tool comprises a tool body, a plurality of splines circumferentially disposed on an outer peripheral surface of the tool body, and a tool operating member extending radially outwardly from the tool body.

DETAILED DESCRIPTION OF THE EMBODIMENTS

Figure 1:
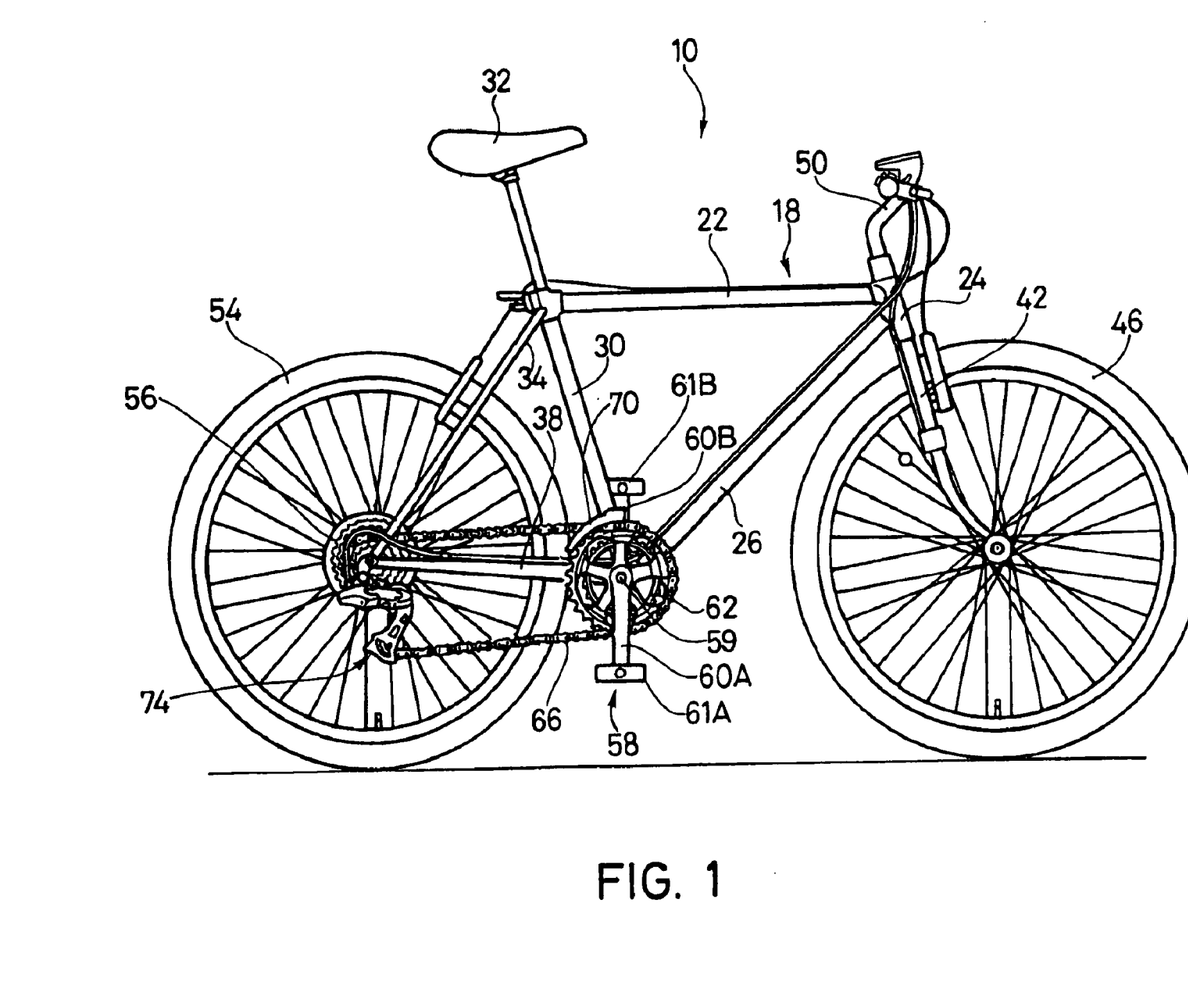
FIG. 1 is a side view of a bicycle that includes a particular embodiment of a crank assembly according to the present invention.

FIG. 1 is a side view of a bicycle 10 that incorporates a particular embodiment of a crank assembly according to the present invention. Bicycle 10 may be any type of bicycle, and in this embodiment bicycle 10 includes a typical frame 18 comprising a top tube 22, a head tube 24, a down tube 26 extending downwardly from head tube 24, a seat tube 30 supporting a seat 32 and extending downwardly from top tube 22, a bottom bracket 33 (FIG. 3) disposed at the junction of down tube 26 and seat tube 30, a pair of seatstays 34 extending rearwardly and downwardly from top tube 22, and a pair of chainstays 38 extending rearwardly from bottom bracket 33. A fork 42 is rotatably supported within head tube 24, and a front wheel 46 is rotatably supported to the lower end of fork 42. Handlebars 50 control the rotational direction of fork 42 and front wheel 46 in a well-known manner. A rear wheel 54 having a plurality of coaxially mounted rear (freewheel) sprockets 56 is rotatably supported at the junction of seatstays 34 and chainstays 38, and a pedal assembly 58 supporting a plurality of front (chainwheel) sprockets 62 is rotatably supported within bottom bracket 33. Pedal assembly 58 includes an axle 59, a right side crank arm 60A attached to the right end of axle 59, a left side crank arm 60B attached to the left end of axle 59, and pedals 61A and 61B rotatably attached to the ends of crank arms 60A and 60B, respectively. Typically, two or three front sprockets 62 rotate coaxially and integrally with right side crank arm 60A. A chain 66 engages one of the plurality of front sprockets 62 and one of the plurality of rear sprockets 56. A front derailleur 70 moves chain 66 from one front sprocket 62 to another, and a rear derailleur 74 moves chain 66 from one rear sprocket 56 to another in accordance with shift commands from a rider in a known manner.

Figure 2:
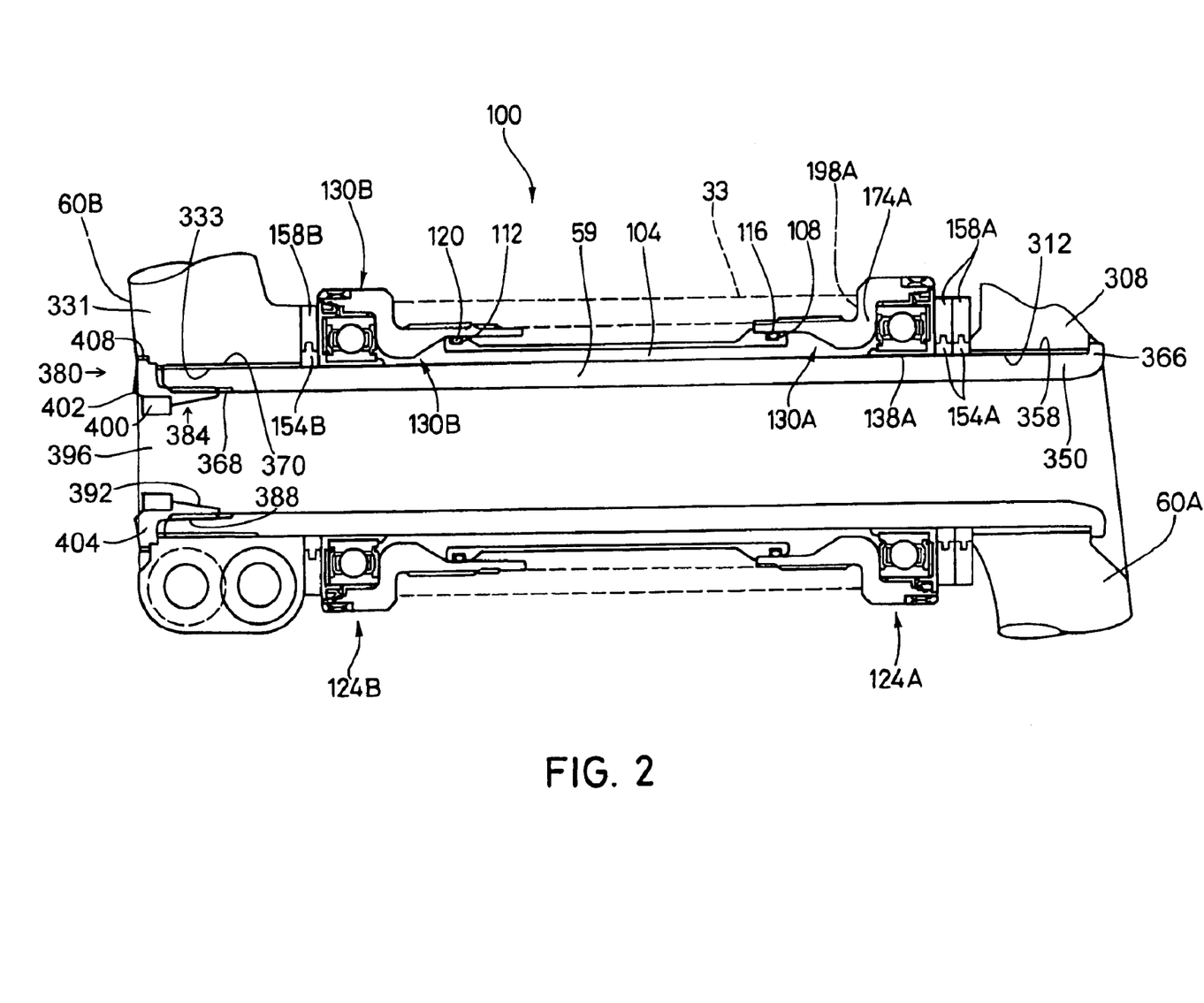
FIG. 2 is a rear cross-sectional view of a particular embodiment of a crank assembly according to the present invention.
Figure 3:
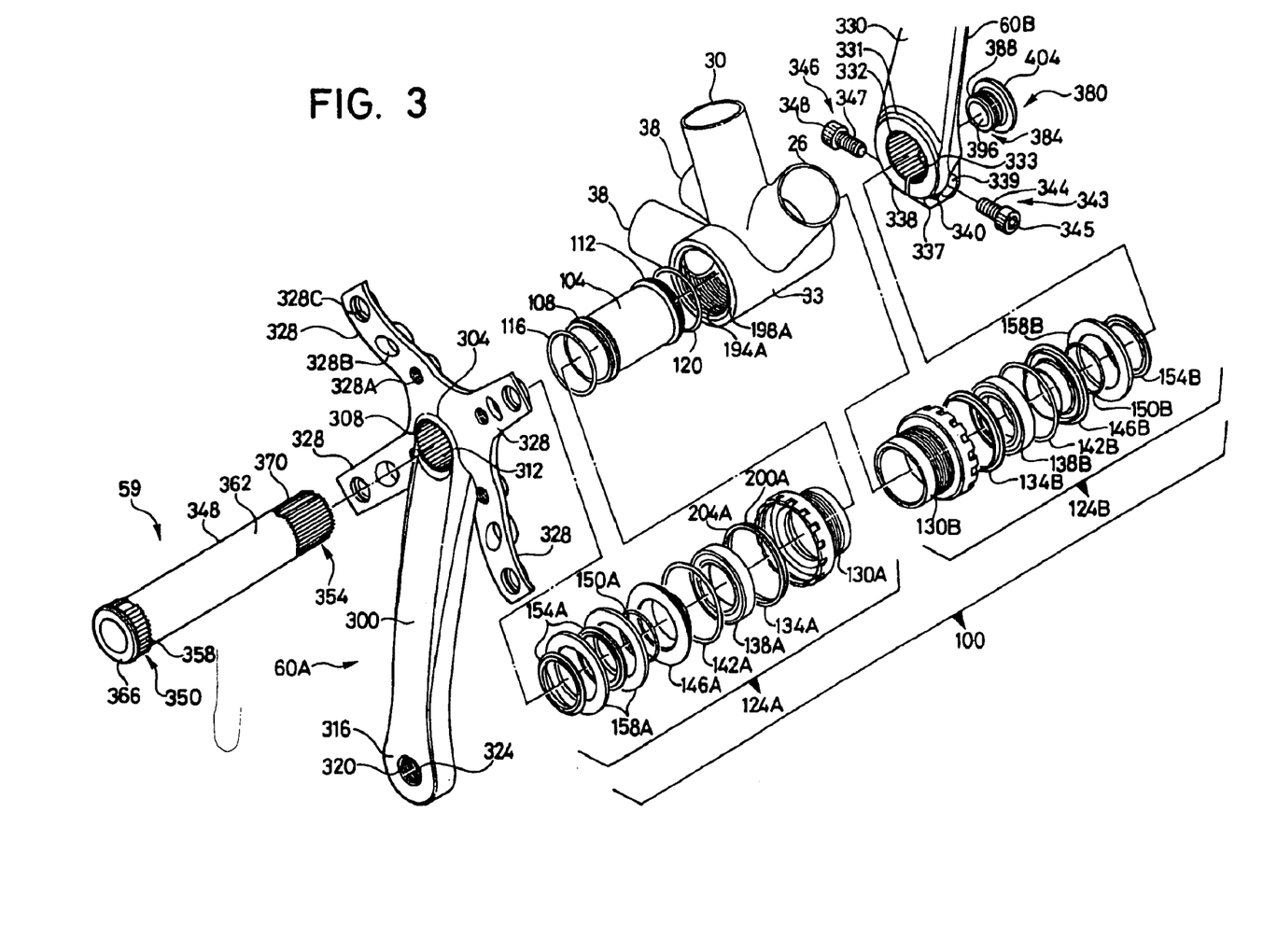
FIG. 3 is an exploded view of the crank assembly shown in FIG. 2.

FIG. 2 is a rear cross-sectional view of a particular embodiment of a bottom bracket assembly 100 according to the present invention, and FIG. 3 is an exploded view of bottom bracket assembly 100. As shown in those figures, bottom bracket assembly 100 comprises bottom bracket 33, a dust tube 104 disposed within bottom bracket 33, wherein dust tube 104 includes annular grooves 108 and 112 at the opposite ends thereof, O-ring seals 116 and 120 fitted within annular grooves 108 and 112, respectively, and adapter assemblies 124A and 124B fitted to the ends of bottom bracket 33 and dust tube 104. Adapter assemblies 124A and 124B are used in part to position axle 59 laterally within bottom bracket 33 so that front sprockets 62 are properly aligned with rear sprockets 56. Such positioning allows front and rear derailleurs 70 and 74 to operate chain 66 in a satisfactory manner.

Figure 4:
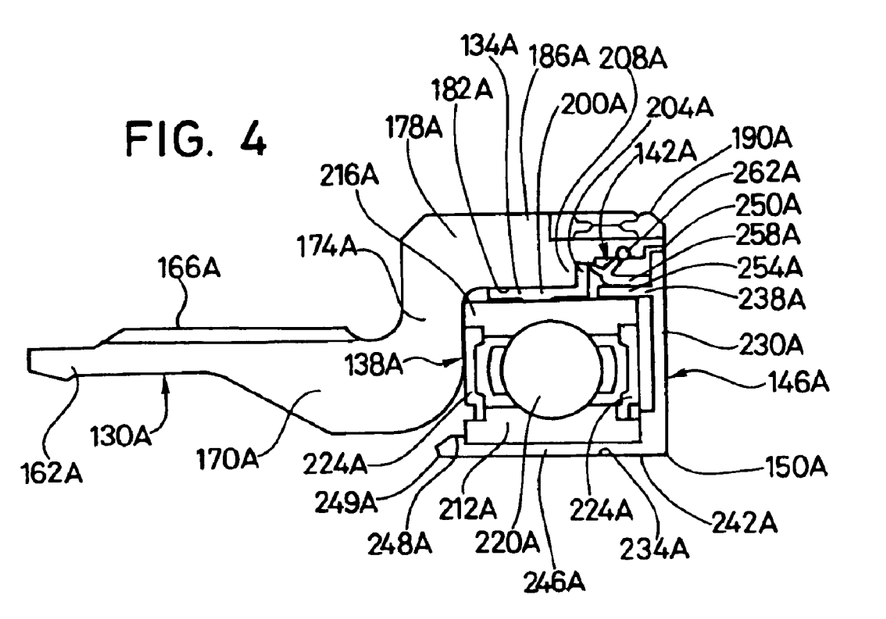
FIG. 4 is a more detailed view of the crank assembly shown in FIG. 2.

As shown more clearly in FIGS. 3 and 4, in this embodiment adapter assembly 124A comprises an adapter member 130A, a bearing ring 134A, a bearing unit 138A, a seal ring 142A, a seal guard 146A, an O-ring 150A, two ring-shaped spacers 154A, and two soft urethane ring-shaped spacer covers 158A that fit around the outer peripheral surfaces of spacers 154A as shown in FIG. 2. Similarly, as shown in FIG. 3, adapter assembly 124B comprises an adapter member 130B, a bushing in the form of a bearing ring 134B, a bearing unit 138B, a seal ring 142B, a seal guard 146B, an O-ring 150B, one ring-shaped spacer 154B, and a soft urethane ring-shaped spacer cover 158B that fits around the outer peripheral surface of spacers 154B. Spacers 154A and 154B help to set the lateral position of axle 59 as shown in FIG. 2. In this embodiment there are two spacers 154A on the right side of bottom bracket assembly 100 and only one spacer on the left side of bottom bracket assembly 100. Thus, axle 59, crank arms 60A and 60B and sprockets 62 are shifted slightly to the right relative to bottom bracket 33.

The adapter assemblies 124A and 124B are constructed the same except for the number of spacers, and they operate in the same manner, so only the details of the components of adapter assembly 124A will be described in detail. As shown more clearly in FIG. 4, adapter member 130A comprises a smaller diameter tubular portion 162A having a threaded outer peripheral surface 166A and a thickened inner portion 170A, a radially outwardly extending side wall 174A, and a larger diameter portion 178A having an inner peripheral surface 182A and an outer peripheral surface 186A forming a tool engaging surface 190A. When adapter assembly 124A is in the assembled state, threaded outer peripheral surface 166A of smaller diameter portion 162A completely screws into a threaded inner peripheral surface 194A (FIG. 3) of bottom bracket 33 until side wall 174A of adapter member 130A abuts against a side edge 198A of bottom bracket 33 as shown in FIG. 2. Thus, in this embodiment there are no exposed portions of the threaded outer peripheral surface 166A.

Bearing ring 134A comprises a tubular portion 200A and a radially outwardly extending side wall 204A. When adapter assembly 124A is in the assembled state, bearing ring 134A contacts the inner peripheral surface 182A of larger diameter portion 178A of adapter member 130A, and side wall 204A abuts against an abutment 208A formed on inner peripheral surface 182A. In this embodiment, bearing ring 134A is formed of a nonmetallic material such as POM plastic.

In this embodiment, bearing unit 138A is a conventional sealed bearing unit comprising an inner bearing race 212A, an outer bearing race 216A, a plurality of ball bearings 220A disposed between inner bearing race 212A and outer bearing race 216A, and annular side covers 224A. When adapter assembly 124A is in the assembled state, outer race 216A contacts bearing ring 134A. Since bearing ring 134A is formed of a nonmetallic material, squeaking and other undesirable noises caused by the contact between these two components are minimized or eliminated. Of course, bearing ring 134A could be formed of any material that suits the application or for cost reasons.

Seal guard 146A functions as a support for seal ring 142A and O-ring 150A, and it comprises an annular base member 230A, an inner tubular member 234A and an outer tubular member 238A. In this embodiment, seal guard 146A is formed of a nonmetallic material such as POM plastic. Inner tubular member 234A extends from a radially inner side surface of base member 230A and, in this embodiment, extends from a radially innermost edge 242A of base member 230A to form a radially inner peripheral surface or inner ledge 246A. When adapter assembly 124A is in the assembled state, inner ledge 246A contacts and supports inner bearing race 212A of bearing unit 138A. A protuberance 248A extends radially outwardly (approx. 0.1 mm in this embodiment) from the free edge 249A of inner tubular member 234A to lock bearing unit 138A in position on inner tubular member 234A. Since seal guard 146A is formed of a nonmetallic material, squeaking and other undesirable noises caused by the contact between these two components are minimized or eliminated. Of course, seal guard 146A could be formed of any material that suits the application or for cost reasons.

Outer tubular member 238A extends from a radially outer side surface of base member 230A and, in this embodiment, is spaced apart from a radially outermost edge 250A of base member 230A to form a radially outer peripheral surface or outer ledge 254A. When adapter assembly 124A is in the assembled state, outer ledge 254A contacts and supports seal ring 142A and the outer bearing race 216A of bearing unit 138A. Thus, bearing unit 138A is sandwiched between inner ledge 246A and outer ledge 254A. While inner tubular member 234A and outer tubular member 238A extend from the same side of base member 230A in this embodiment, it is not necessary for them to do so.

In this embodiment, seal ring 142A functions as an outer seal, and it is a generally L-shaped ring member having a base portion 258A and a radially outwardly extending lip portion 262A that forms an acute angle with base portion 258A. Base portion 258A contacts and is supported by outer ledge 254A, and lip portion 262A contacts the inner peripheral surface 128A of adapter member 130A. Of course, seal ring 142A may take many different forms, and there need not be direct contact between the components. O-ring 150A functions as an inner seal, and it is disposed at the radially inner edge 242A of base member 230A opposite inner tubular member 234A. When adapter assembly 124A is in the assembled state, O-ring 150A contacts axle 59. Seal ring 142A and O-ring 150A in combination prevent contaminants from entering the space containing bearing unit 138A more advantageously than prior art sealing structures.

Figure 5:
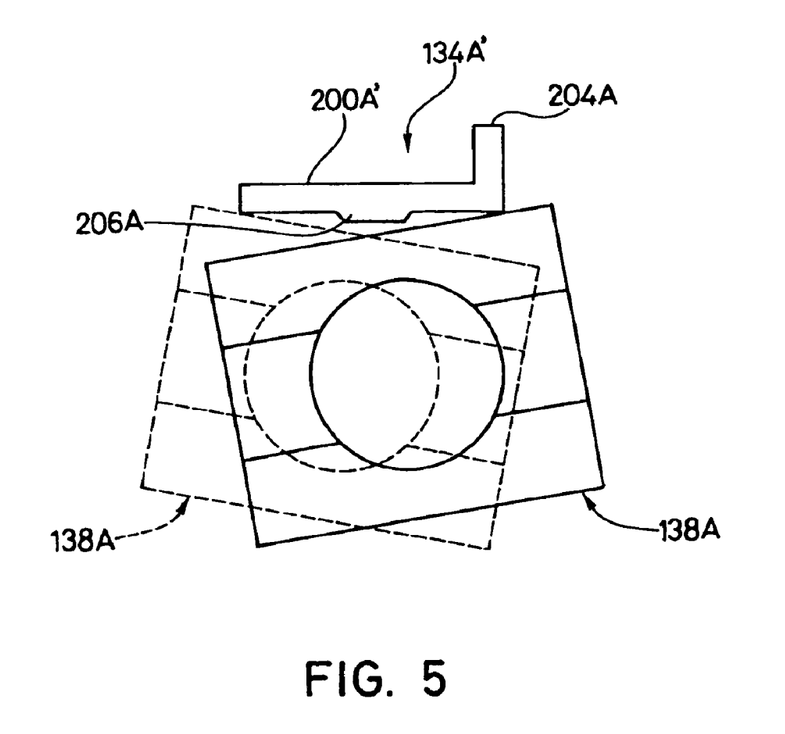
FIG. 5 is a cross sectional view of an alternative embodiment of the bushing shown in FIG. 4.

FIG. 5 is a detailed cross sectional view of a bearing ring 134A' that represents an alternative embodiment of the bearing ring 134A shown in FIG. 4. As with bearing ring 134A, bearing ring 134A' comprises a tubular portion 200A' and a radially outwardly extending side wall 204A'. However, in this embodiment a centrally disposed bushing protuberance 260A extends radially inwardly from tubular portion 200A for contacting outer bearing race 216A when adapter assembly 124A is in the assembled state. If bearing unit 138A is tilted for some reason as shown by the broken lines in FIG. 5, such as if bottom bracket 33 is bent as a result of a manufacturing defect or a collision, then bushing protuberance 260A accommodates such tilting. Although bushing protuberance 260A has a trapezoidal shape in this embodiment, it could have a spherical or other shape to perform the same function As shown in FIG. 3, right side crank arm 60A comprises a crank arm body 300, an axle mounting boss 304 having an axle mounting opening 308 with a splined inner peripheral surface 312, a pedal mounting boss 316 having a pedal mounting opening 320 with a threaded inner peripheral surface 324, and four sprocket mounting arms 328 extending radially outwardly from axle mounting boss 304. In this embodiment, each sprocket mounting arm 328 has three sprocket mounting openings 328A, 328B and 328C for mounting three front sprockets.

Figure 6:
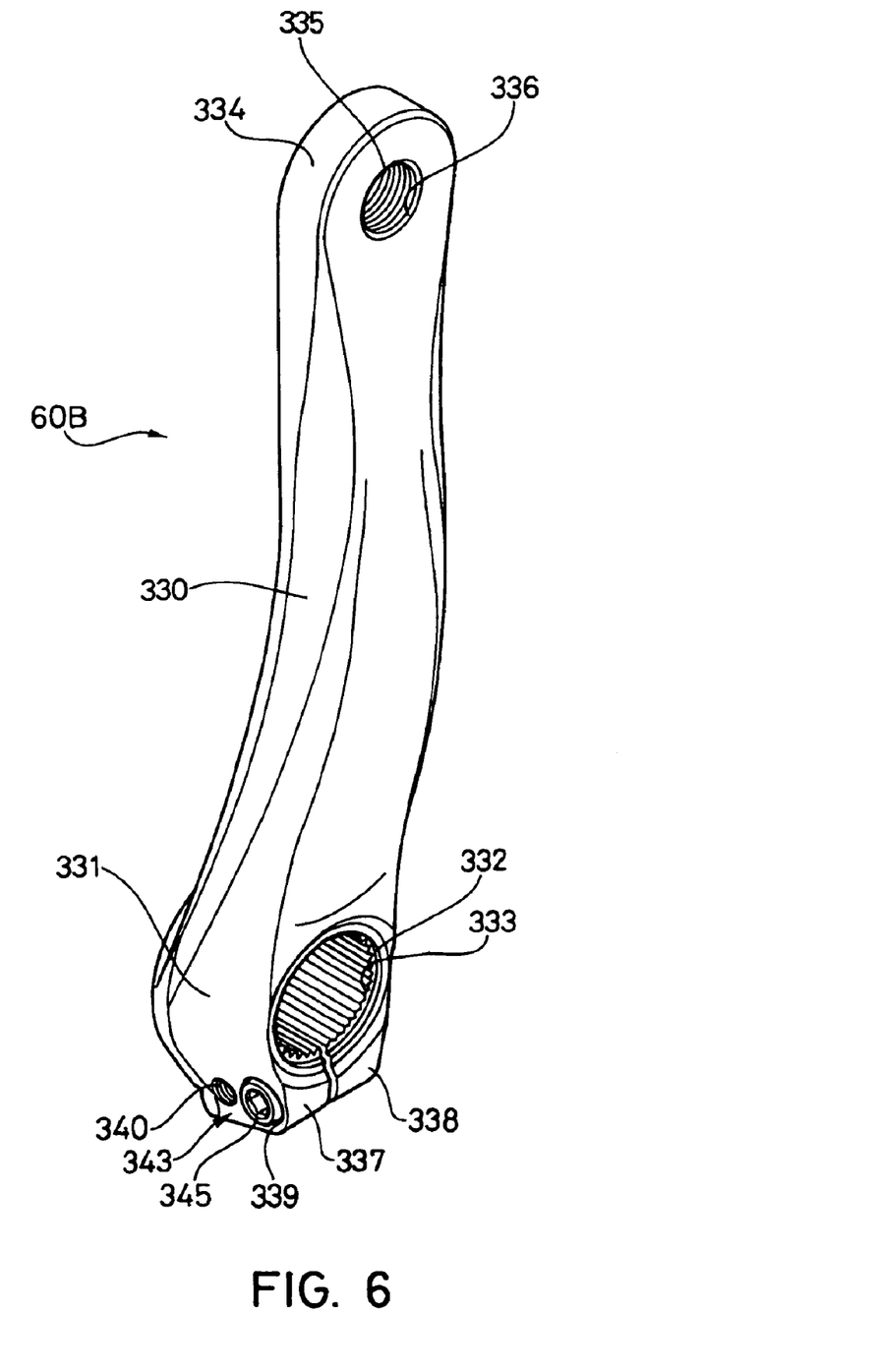
FIG. 6 is an oblique view of a particular embodiment of a left side crank arm according to the present invention.
Figure 7:
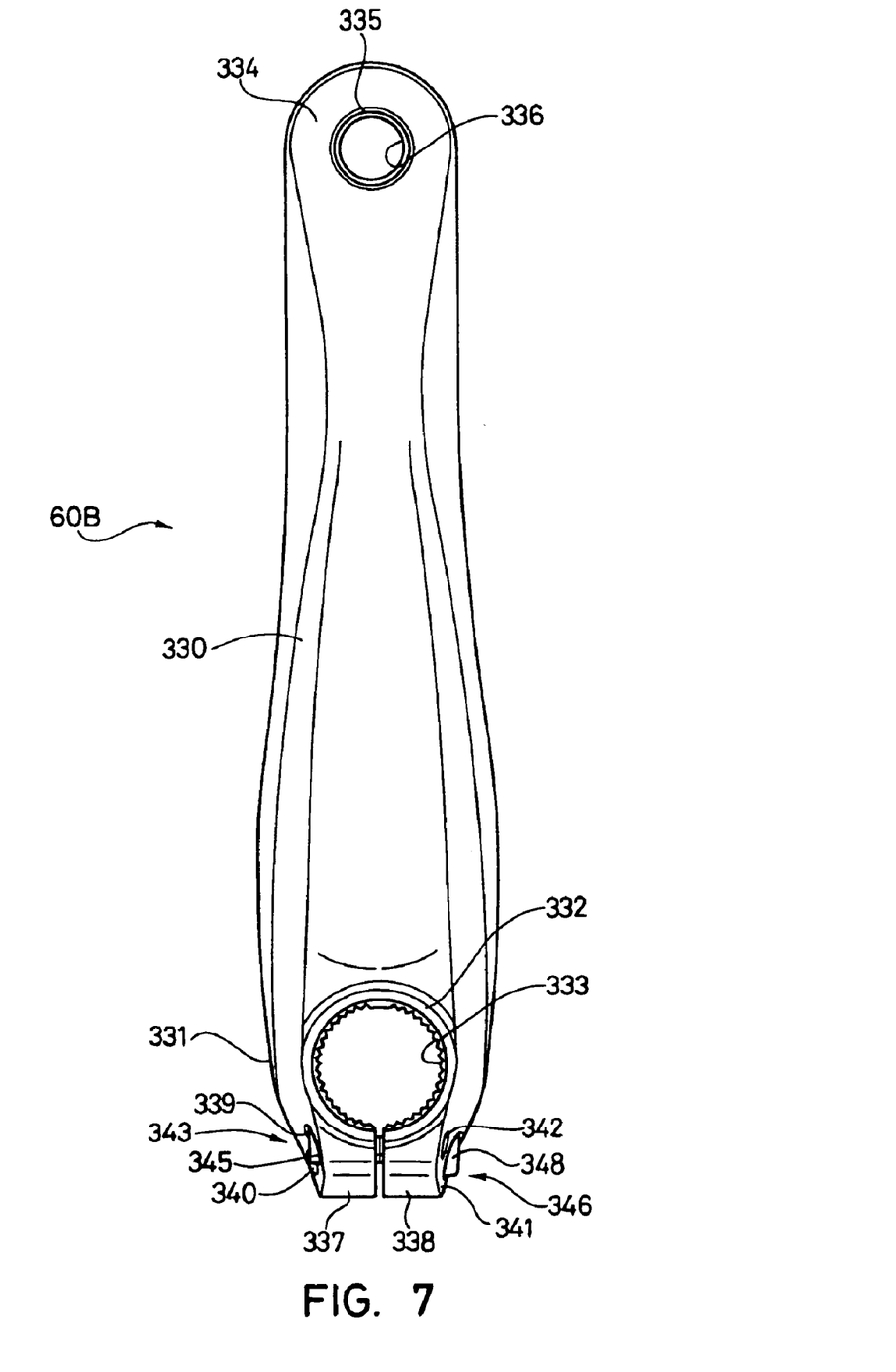
FIG. 7 is an outer view of the crank arm shown in FIG. 6.

As shown in FIGS. 6 and 7, left side crank arm 60B comprises a crank arm body 330, an axle mounting boss 331 having an axle mounting opening 332 with a splined inner peripheral surface 333, and a pedal mounting boss 334 having a pedal mounting opening 335 with a threaded inner peripheral surface 336. In this embodiment, axle mounting boss 331 includes a first mounting ear 337 spaced apart from but in close proximity to a second mounting ear 338. First mounting ear 337 includes an unthreaded (e.g., first) fastener opening 339 and a threaded (e.g., third) fastener opening 340, and second mounting ear 338 includes an unthreaded (e.g., second) fastener opening 341 and a threaded (e.g., fourth) fastener opening 342. A first fastener such as a crank arm bolt 343 having a threaded shank 344 and a head 345 extends through unthreaded fastener opening 339 in first mounting ear 337 and screws into threaded opening 342 in second mounting ear 338 such that head 345 abuts against first mounting ear 337. Similarly, a second fastener such as a crank arm bolt 346 having a threaded shank 347 and a head 348 extends through unthreaded fastener opening 341 in second mounting ear 338 and screws into threaded opening 340 in first mounting ear 337 such that head 348 abuts against second mounting ear 338. Crank arm bolts 343 and 346 thus tighten first mounting ear 337 and second mounting ear 338 towards each other for clamping axle mounting boss 331 around axle 59 as discussed below.

Axle 59 has an axle body 348 including a first end portion 350 and a second end portion 354. First end portion 350 has a plurality of circumferentially disposed splines 358 that protrude radially outwardly relative to an outer peripheral surface 362 of axle body 348 for engaging the splined inner peripheral surface 312 of axle mounting boss 308 of crank arm 60A as shown in FIG. 2. A radially outwardly extending flange 366 is disposed at the extreme end of end portion 350 for abutting against the laterally outer surface of axle mounting boss 308 of crank arm 60A. Second end portion 354 of axle 59 has a threaded inner peripheral surface 368 (FIG. 2) and a plurality of circumferentially disposed splines 370 for engaging the splined inner peripheral surface 333 of axle mounting boss 331 of crank arm 60B. In this embodiment, splines 370 do not extend radially outwardly relative to the outer peripheral surface 362 of axle body 348. Instead, the splines 370 are flush with the outer peripheral surface of 362 of axle body 348. Second end portion 354 and axle body 348 thus are capable of freely passing through opening 308 in crank axle mounting boss 304 of crank arm 60A and though dust tube 104 and adapter assemblies 124A and 124B so that second end portion 354 of axle 59 extends into opening 332 in crank axle mounting boss 331 of crank arm 60B and flange 366 abuts against mounting boss 304 of crank arm 60A.

An axle bolt 380 screws into the threaded inner peripheral surface 368 of second end portion 354 of axle 59. As shown in FIGS. 2, 3, 8 and 9, axle bolt 380 comprises a bolt body 384 having a threaded outer peripheral surface 388 and an inner peripheral surface 392 defining an opening 396. A plurality of (e.g., eight) splines 400 are circumferentially disposed on the inner peripheral surface 392 of an end 402 of bolt body 384, and a flange 404 with a knurled outer peripheral surface 408 extends radially outwardly from end 402 of bolt body 384. In this embodiment, each spline 400 comprises an arcuate projection 412 adjacent to a groove 416.

Figure 8:
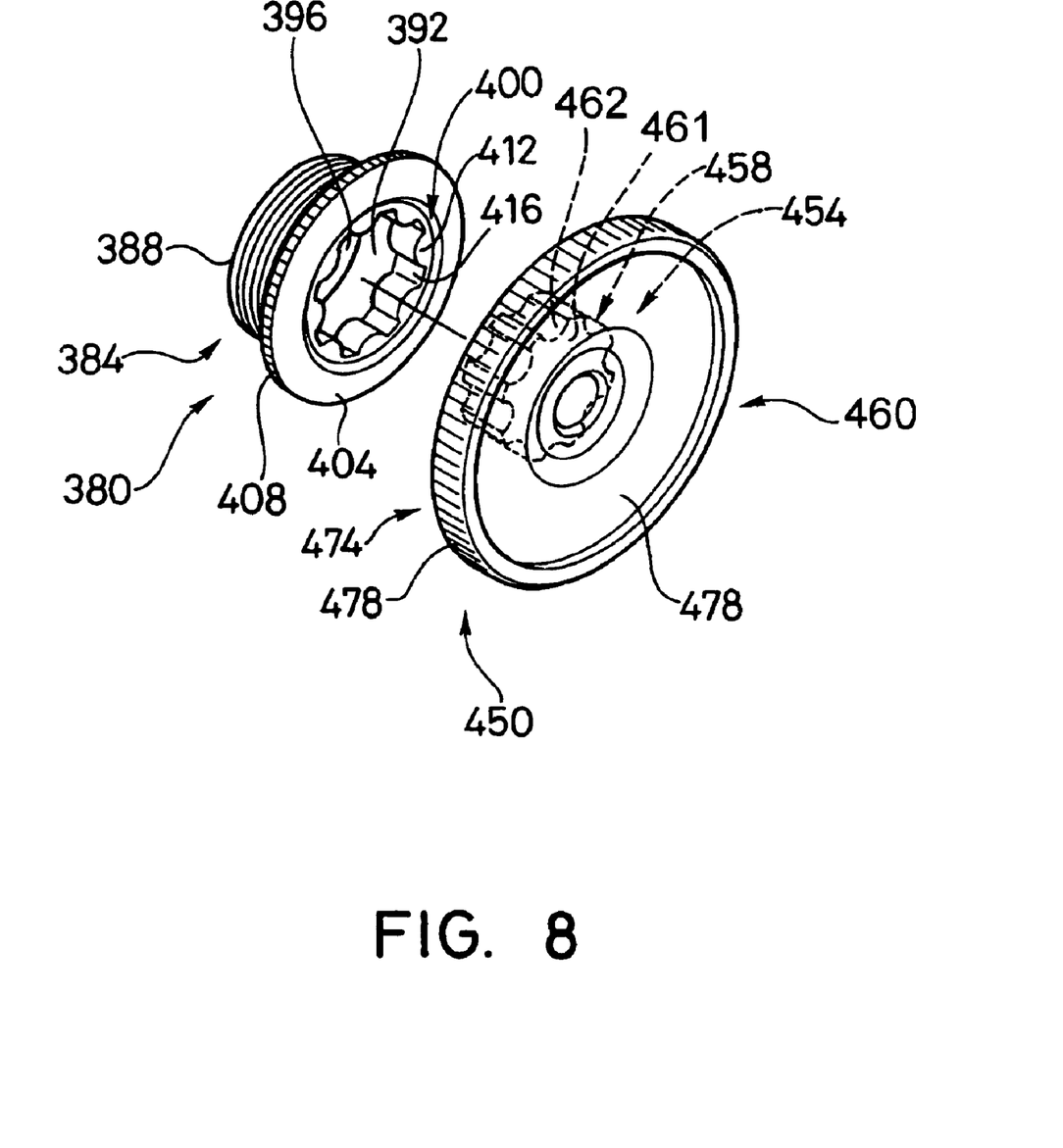
FIG. 8 is an oblique view of particular embodiments of an axle bolt and a tool for mounting the axle bolt to the axle.
Figure 9:
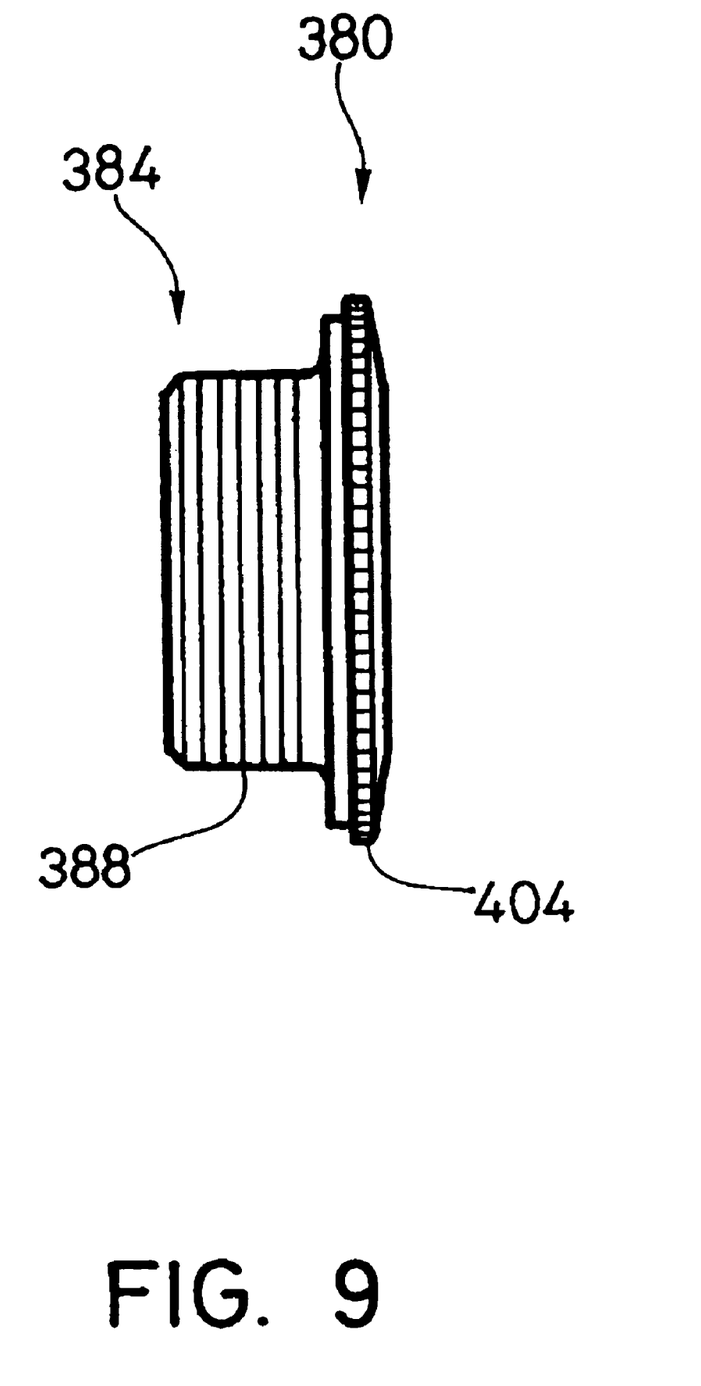
FIG. 9 is a side view of the axle bolt shown in FIG. 8.
Figure 10:
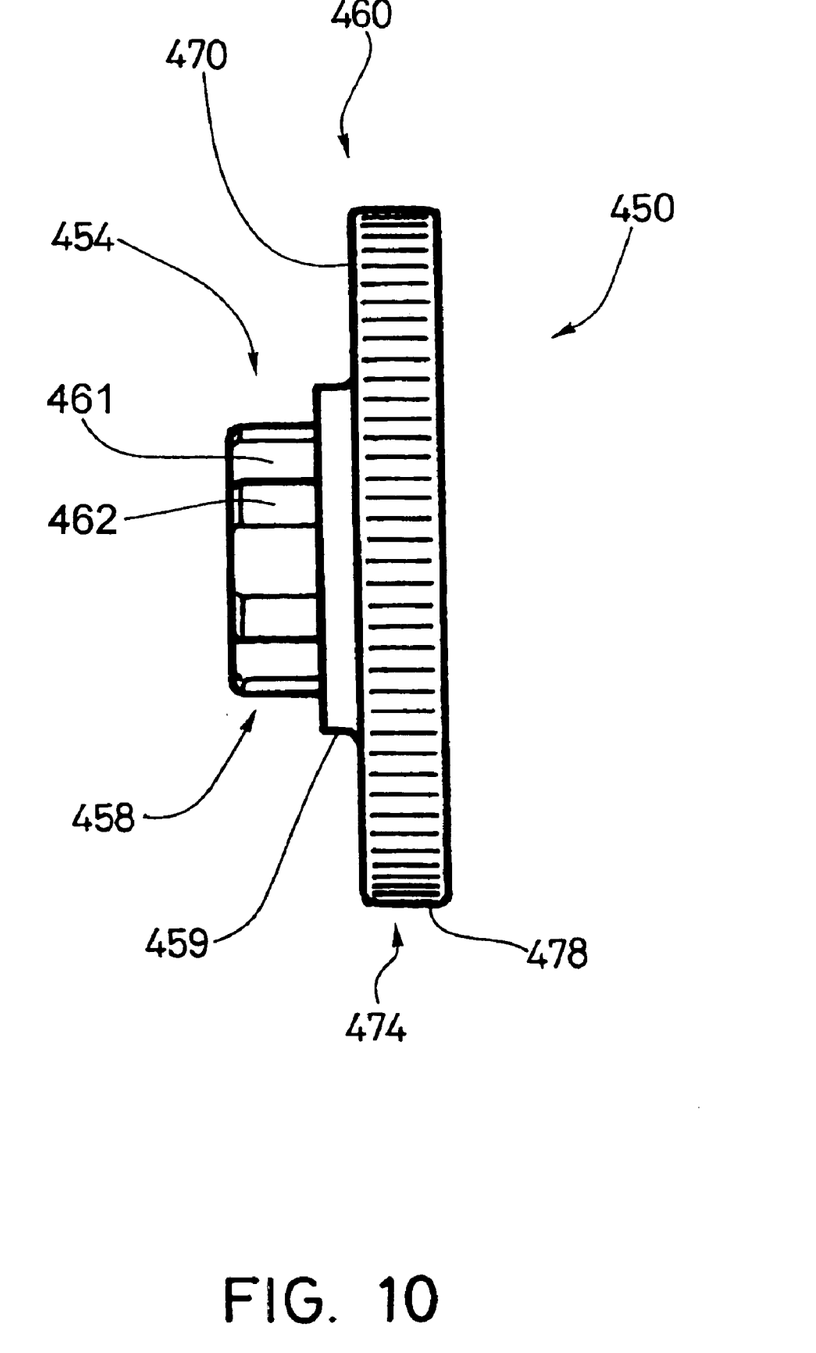
FIG. 10 is a side view of the tool shown in FIG. 8.

A tool 450 shown in FIGS. 8 and 19 is provided for screwing axle bolt 380 into the threaded inner peripheral surface 368 of second end portion 354 of axle 59. Tool 450 comprises a tool body 454 and a tool operating member 460. Tool body 454 comprises a splined portion 458 and a stepped portion 459 disposed between splined portion 458 and tool operating member 460, wherein stepped portion 459 extends radially outwardly form splined portion 458. Splined portion 458 comprises a plurality of (e.g., eight) circumferentially disposed splines, each comprising a radially outwardly extending spline projection 461 adjacent to a spline groove 462. Tool operating member 460 extends radially outwardly form stepped portion 459 of tool body 454. In this embodiment, tool operating member 460 has a disk shape, and tool body 454 extends from a side surface 470 of tool operating member 460. A gripping rim 474 having a knurled outer peripheral surface 478 is disposed at a radially outermost portion of tool operating member 460 such that gripping rim 474 extends laterally from a side surface 478 of tool operating member 460.

To assemble axle 59 to bottom bracket 33, dust tube 104, O-ring seals 116 and 120 and adapter assemblies 124A and 124B are mounted to bottom bracket 33. Axle 59 is passed through opening 308 in crank axle mounting boss 304 of crank arm 60A and though adapter assemblies 124A and 124B and dust tube 104 so that second end portion 354 of axle 59 extends into opening 332 in crank axle mounting boss 331 of crank arm 60B and flange 366 abuts against mounting boss 304 of crank arm 60A. Axle bolt 380 is then screwed into the threaded inner peripheral surface 368 of axle 59 using tool 450 by engaging splined portion 458 of tool 450 with splines 400 of axle bolt 380 and by gripping and turning gripping rim 474 until the desired amount of play exists between crank arms 60A and 60B and spacers 154A and 154B. Thereafter, bolts 343 and 346 are tightened while axle mounting boss 331 of crank arm 60B abuts against flange 404 of axle bolt 380 to set the final position of crank arm 60B and thereby the play between crank arms 60A and 60B and spacers 154A and 154B.

While the above is a description of various embodiments of the present invention, further modifications may be employed without departing from the spirit and scope of the present invention. For example, the size, shape, location or orientation of the various components may be changed as desired. Components that are shown directly connected or contacting each other may have intermediate structures disposed between them. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A crank arm comprising:

a crank arm body having an axle mounting boss on a first end and a pedal mounting boss on a second end;

wherein the axle mounting boss defines an opening for receiving an axle therein;

wherein the axle mounting boss includes a first mounting ear in close proximity to a second mounting ear;

wherein the first mounting ear includes a first fastener opening;

wherein the second mounting ear includes a second fastener opening;

wherein the first mounting ear includes a third fastener opening in close proximity to the first fastener opening;

wherein the second mounting ear includes a fourth fastener opening disposed in close proximity to the second fastener opening;

wherein the fourth fastener opening is structured for lockingly engaging a first fastener:

wherein the first fastener opening is structured to allow relative movement between the first mounting ear and the first fastener when the first fastener lockingly engages the fourth fastener opening;

wherein the third fastener opening is structured for lockingly engaging a second fastener: and wherein the second fastener opening is structured to allow relative movement between the second mounting ear and the second fastener when the second fastener lockingly engages the third fastener opening.

2. The apparatus according to claim 1 wherein the second fastener opening has un unthreaded inner peripheral surface, and wherein the fourth fastener opening has a threaded inner peripheral surface.

3. The apparatus according to claim 2 wherein the first fastener opening has an unthreaded inner peripheral surface, and wherein the third fastener opening has a threaded inner peripheral surface.

4. The apparatus according to claim 1 wherein the fourth fastener opening has a threaded inner peripheral surface, and wherein the first fastener opening is dimensioned so that a threaded fastener can pass through it without screwing into it.

5. The apparatus according to claim 1 wherein the third fastener opening has a threaded inner peripheral surface, and wherein the second fastener opening is dimensioned so that a threaded fastener can pass through it without screwing into it.

* * * * *